Sept. 28, 1937.  W. M. ROBINSON ET AL  2,094,495
METHOD OF MAKING PIPE JOINTS

Original Filed April 28, 1930

Ward M. Robinson,
Harold K. Rader,
Inventors,
Delos G. Haynes,
Attorney.

Patented Sept. 28, 1937

2,094,495

UNITED STATES PATENT OFFICE 2,094,495

METHOD OF MAKING PIPE JOINTS

Ward M. Robinson and Harold K. Rader, Decatur, Ill., assignors to Mueller Brass Co., Port Huron, Mich., a corporation of Michigan Original application April 28, 1930, Serial No. 448,090. Patent No. 1,963,421, June 19, 1934. Divided and this application May 17, 1934, Serial No. 726,075

1 Claim. (Cl. 113—112)

This invention relates to methods of making joints, and with regard to certain more specific features, to methods of making joints between pipes and fittings or the like, as in piping systems.

This application is a division of our application, Serial No. 448,090, filed April 28, 1930, now Patent No. 1,963,421, granted June 19, 1934, for Joint.

Among the several objects of the invention may be noted the provision of a method of making a joint of a telescoping type with solder or other cementitious mass of material introduced to form a seal; the provision of a method of making a joint of the class described in which said cementitious mass is fed in from one end of the joint after said mass has been melted; and the provision of a method of making a joint of the class described in which said cementitious mass positions itself by a capillary phenomenon. Other objects will be in part obvious and in part pointed out hereinafter.

The invention accordingly comprises the elements and combinations of elements, steps and sequence of steps, features of construction, and arrangements of parts which will be exemplified in the structure hereinafter described, and the scope of the application of which will be indicated in the following claim.

In the accompanying drawing, in which are illustrated several of various possible embodiments of the invention, Fig. 1 is a sectional view of one form of the invention;

Similar reference characters indicate corresponding parts throughout the several views of the drawing.

Figure 1:
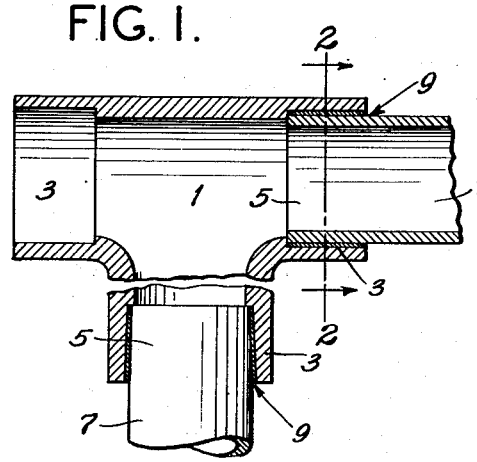

Referring now more particularly to Fig. 1, there is illustrated at numeral 1 a plumbing or like fitting, the shape, contour and application of which as shown in the drawing is exemplary. This fitting 1, at each point that a pipe is to be fastened thereto is provided with a relatively smooth or plain bore 3 adapted to telescopingly receive the relatively smooth or plain end 5 of a length of pipe 7. The clearance between the diameter of the end 5 and bore 3 may be of the order of a few thousandths of an inch; or the parts 3, 5, with like clearances, may have cooperating tapers widening outwardly in the direction of the pipe 7 (see the lower broken away connection in Fig. 1).

Figure 2:
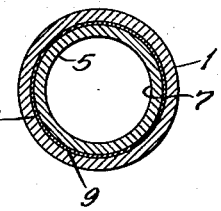
Fig. 2 is a cross-section taken on line 2—2 of Fig. 1.

The parts described, in application, are telescoped. In such position, the parts present an exterior, exposed circular line or region of juncture, indicated by numeral 9. A surface of pipe extends in one direction away from this region of juncture, while a surface of the fitting extends away in the opposite direction. External heat is then applied to the fitting and/or end of pipe 7 by a blow torch or the like and solid solder or similar cementitious material is fed into the position indicated by numeral 9, that is, externally at the outside and at one end of the joint. Thus the solder is applied at the exterior juncture between the members 1 and 7. The solder or cement is caused by conduction of heat from the members 1 and 7 to melt to a liquid and being in contact with the heated portions of the pipe 7 and fitting 1 travels, or is driven by capillary action into the joint and around the same (Fig. 2), so that all or substantially all juxtaposed surfaces between the pipe and fitting are joined and sealed. The solder finds its way to the end of the portion 5 which projects into the fitting and encompasses substantially the entire surface thereof. It is to be understood that the parts are suitably cleaned before assembly, so that the solder will adhere properly. The effect of capillarity is particularly well demonstrated when the joint is made with the common axis of the pipe and fitting in vertical position, with the region of juncture facing downwardly, as shown in the lower portion of Fig. 1, for under such conditions the solder flows directly upwardly into the interfacial region.

Figure 3:
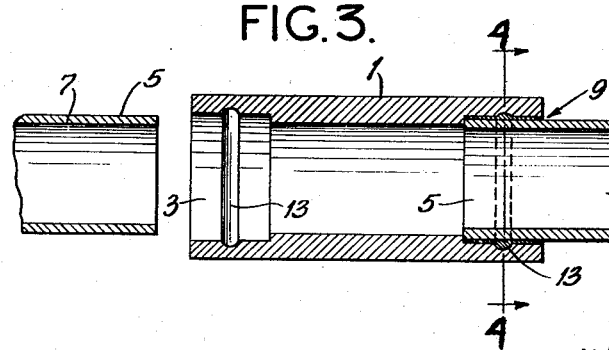
Fig. 3 is a sectional view of a second form of the invention.
Figure 4:
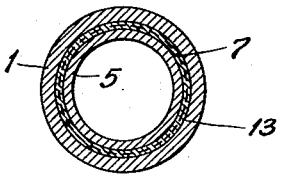
Fig. 4 is a cross section taken on line 4—4 of Fig. 3.

In Fig. 3 is shown another alternative, similar in all respects to Fig. 1, with the exception of the addition of a peripheral groove 13 in the fitting adjacent the section 5 of the pipe 7. This groove is not connected with or accessible with the exterior of the joint and serves distributive as distinct from delivery purposes, in conjunction with the capillary effect. Solder in this modification is applied at point 9 with heat, as described in connection with said Fig. 1.

The theory of the groove of Fig. 3 is that the solder in certain cases may tend to travel only a certain distance longitudinally to form a complete peripheral cylindrical sealing mass. The groove is placed near the end of the predetermined distance and functions as a collecting sump from which a fresh start toward the interior of the joint is effected for the capillary or like phenomenon. It will thus be seen that, if the length of the insertion of the pipe into the fitting is over twice this predetermined distance, more grooves may be required to provide fresh starts for the inward capillary transmission of the then liquid cement.

It is to be understood that with all forms described, a slight or limited relative rotation between the telescoped members as the sealing material is applied and heated is beneficial. Apparently a slight wiping action aids the capillary action.

In view of the above, it will be seen that the several objects of the invention are achieved and other advantageous results attained.

As many changes could be made in carrying out the above methods and constructions without departing from the scope of the invention, it is intended that all matter contained in the above description or shown in the accompanying drawing shall be interpreted as illustrative and not in a limiting sense.

We claim:

The method of making a joint, in a piping system, between a length of pipe and a fitting therefor, comprising telescoping the end of the pipe and the fitting together in such manner that there is provided, between the pipe and the fitting, an annular interfacial space of capillary magnitude, and there is likewise provided an exposed exterior circular region of juncture with the pipe and the fitting presenting exposed exterior faces that extend away from the region of juncture in opposite directions, positioning the telescoped pipe and fitting so that their common axis is substantially vertical, with the aforesaid region of juncture facing downwardly, exteriorly heating the telescoped pipe and fitting to a temperature substantially above the melting point of a solder, applying a solid mass of such solder along the aforesaid region of juncture of the exposed surfaces and melting the solid mass of solder by the conduction of heat from the heated pipe and fitting, whereby the melted solder is drawn upwardly into the aforesaid interfacial space and is spread throughout said space completely to fill said space entirely by capillary action, and thereafter permitting the telescoped pipe and fitting to cool, whereby the solder solidifies in position between the pipe and fitting to form a fluid-tight sealed joint.

WARD M. ROBINSON.
HAROLD K. RADER.